(12) United States Patent
Platko

(10) Patent No.: US 6,256,693 B1
(45) Date of Patent: Jul. 3, 2001

(54) MASTER/SLAVE DATA BUS EMPLOYING UNDIRECTIONAL ADDRESS AND DATA LINES AND REQUEST/ACKNOWLEDGE SIGNALING

(75) Inventor: John J. Platko, Acton, MA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/464,262

(22) Filed: Dec. 17, 1999

Related U.S. Application Data

(60) Provisional application No. 60/143,875, filed on Jul. 15, 1999.

(51) Int. Cl.[7] .................................................. G06F 13/42
(52) U.S. Cl. ............................ 710/105; 710/126; 710/129
(58) Field of Search ............................. 710/105, 126–130

(56) References Cited

U.S. PATENT DOCUMENTS

| | | | |
|---|---|---|---|
| 4,339,793 | * | 7/1982 | Marenin .............................. 710/200 |
| 4,378,589 | * | 3/1983 | Finnegan et al. .................... 710/130 |
| 4,547,879 | * | 10/1985 | Hamelin et al. ..................... 370/438 |
| 4,947,316 | * | 8/1990 | Fisk et al. ............................ 710/105 |
| 5,729,703 | * | 3/1998 | Onn et al. ............................ 710/126 |

OTHER PUBLICATIONS

IBM Technical Disclosure Bulletin, "Chiplets' Interconnections Pathway Control and Merging of Master and Slaves Buses", vol. 38, No. 06 Jun. 1995, pp. 375–377.*

* cited by examiner

*Primary Examiner*—Sumati Lefkowitz
(74) *Attorney, Agent, or Firm*—Weingarten, Schurgin, Gagnebin & Hayes LLP

(57) ABSTRACT

A bus and associated logic employ a master/slave communication protocol and unidirectional point-to-point connections. Unidirectional address lines carry address signals from a bus master to bus slaves. One set of unidirectional data lines carry data from the master to the slaves, and another set carries data from the slaves to the master. The master initiates a bus transaction by asserting a request signal and placing an address on the address lines. A slave device responds by returning an acknowledge signal. The master maintains the address and the request on the bus until one clock cycle after receiving the acknowledge signal. For a read, the data is returned in the cycle following the acknowledge signal. For a write, the master places the write data on the outgoing data lines and maintains the data value on the bus until one cycle after the acknowledge signal. Additionally, the master deasserts the request signal for at least one cycle between bus transactions.

15 Claims, 4 Drawing Sheets

MASTER/SLAVE DATA BUS EMPLOYING UNDIRECTIONAL ADDRESS AND DATA LINES AND REQUEST/ACKNOWLEDGE SIGNALING

CROSS REFERENCE TO RELATED APPLICATIONS

This application claims the benefit under 35 U.S.C. §119 (e) of provisional patent application No. 60/143,875, filed Jul. 15, 1999 and entitled "T Bus—A Simple High Performance Bus."

STATEMENT REGARDING FEDERALLY SPONSORED RESEARCH OR DEVELOPMENT

Not Applicable

BACKGROUND OF THE INVENTION

The present invention is related to the field of processing systems, and more particularly to buses used in processing systems to interconnect a processor with other devices.

In processing systems, it is necessary for a processor to communicate with other system elements such as memory, control/status registers, peripheral devices, etc. It is common to employ a "bus", or shared multi-wire connections, as a communications transport mechanism for such purposes.

There are certain features of known buses that are advantageous in certain kinds of processing systems. For example, buses intended for widespread use by different vendors have relatively complex signaling and data transfer mechanisms, in order to support a variety of types of devices and/or processors. Also, buses commonly provide for data transfer in different directions at different times, necessitating the use of bidirectional bus interface logic at some or all connection points to the bus. Bidirectional buses are especially useful for communication among different physical devices such as different integrated circuits, which have a limited number of package pins.

However, the above characteristics of known buses can be disadvantageous in other environments. In a complex integrated circuit (IC) having an on-chip bus, for example, the use of complex bus protocols and bidirectional data transfer make it difficult to verify the correctness of the IC design, and can also impair testability during manufacture. Accordingly, there is a need for a bus that is particularly suitable for on-chip use, and which avoids reliance on bidirectional data transfer.

BRIEF SUMMARY OF THE INVENTION

In accordance with the present invention, a bus protocol and associated logic are disclosed that improve both the verifiability and testability of integrated circuits in which the bus is used. The bus employs unidirectional point-to-point connections rather than bidirectional connections, which further improves testability and also improves performance.

The disclosed bus has unidirectional address lines for carrying address signals from a single bus master to one or more bus slaves. The bus also has unidirectional data lines for carrying data from the master to the slaves, and unidirectional data lines for receiving data from the slaves. The master initiates a bus transaction by asserting a request signal while placing the address for the transaction on the address lines. A slave device responds to the request by returning an acknowledge signal. The master maintains the address and the request on the bus until a predetermined time after the acknowledge signal is received. For a read, the data is returned at a predetermined time after the acknowledge signal is received. For a write, the master places the write data on the outgoing data lines and maintains the data value on the bus until a predetermined time after the acknowledge signal is received. In one embodiment, the predetermined times are measured in clock cycles, so that there are no special asynchronous timing requirements for proper bus operation. Additionally, the master deasserts the request signal for at least one cycle between bus transactions, which enables the design of slave interface logic to be simplified.

Logic interfacing to the bus operates straightforwardly, due to the use of predetermined timing relationships in the signalling and the use of unidirectional rather than bidirectional connections. There are only a small number of operations to be tested, and each one follows a predictable pattern. Proper operation can be readily verified during the design phase and tested during manufacturing.

Other aspects, features and advantages of the present invention will be apparent from the detailed description below.

BRIEF DESCRIPTION OF THE SEVERAL VIEWS OF THE DRAWING

The invention will be more fully understood by reference to the following detailed description of the invention in conjunction with the drawing, of which.

DETAILED DESCRIPTION OF THE INVENTION

Figure 1:
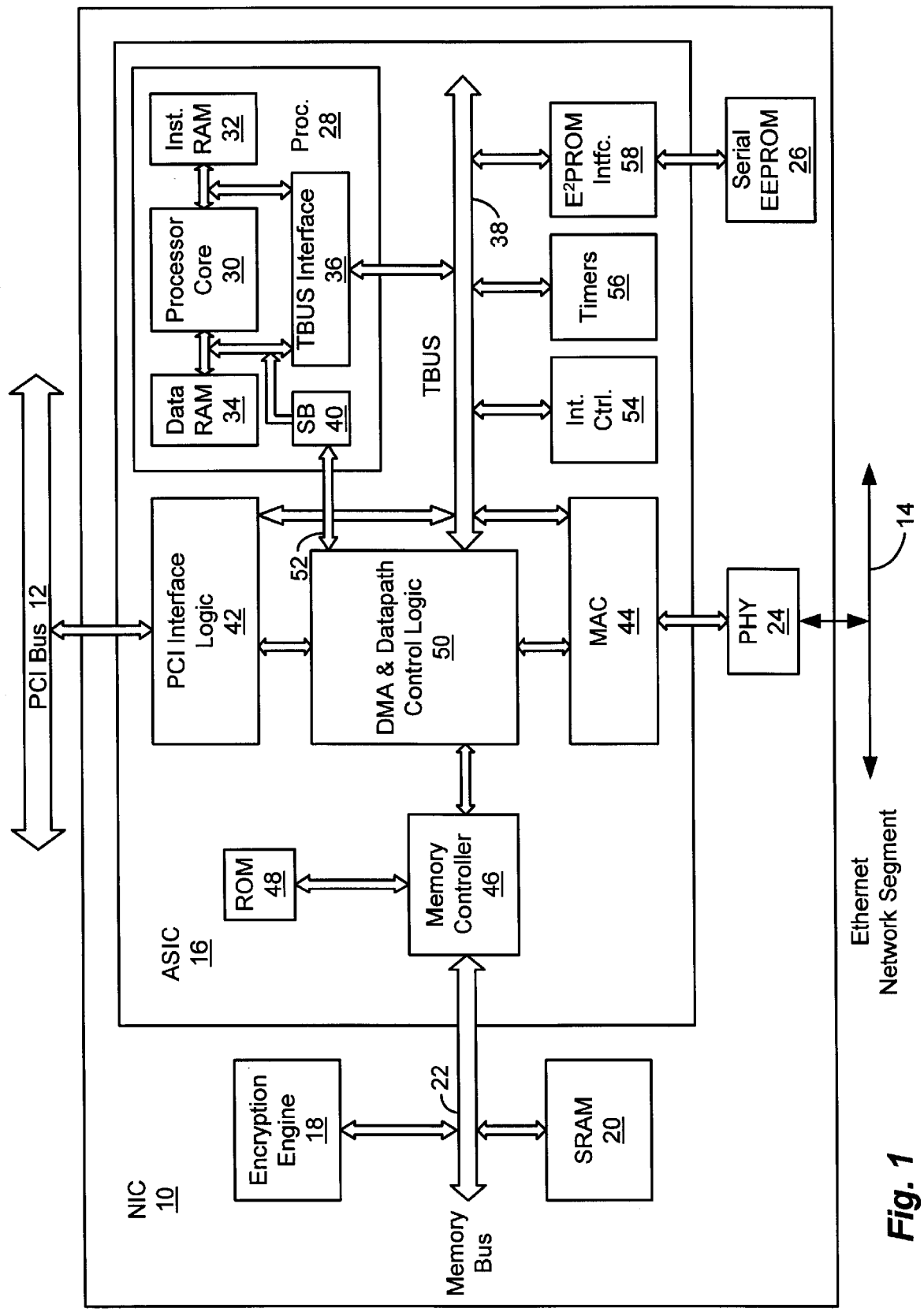
FIG. 1 is a block diagram of a network interface card (NIC) having a processor and other components connected to a bus according to the present invention.

FIG. 1 shows a block diagram of a network interface card (NIC) 10. As shown, the NIC 10 is intended for connection between a system I/O bus, such as a Peripheral Components Interconnect (PCI) bus 12, and an Ethernet network segment 14. The NIC 10 includes an application-specific integrated circuit (ASIC) 16 having an internal structure described below. The ASIC 16 is connected to static random access memory (SRAM) 20 by a memory bus 22. An optional encryption engine co-processor 18, which in one embodiment can be the so-called Sidewinder IC from VLSI Technology, Inc., of San Jose, Calif., can also be connected to the memory bus 22. The ASIC 16 is also connected to PHY circuitry 24 that implements a physical layer interface to the Ethernet segment 14. An electrically erasable programmable read only memory (EEPROM) 26 is also connected to the ASIC 16.

The ASIC 16 is a highly integrated processing subsystem specially tailored for network interface applications. It includes a processor 28, which in a preferred embodiment employs a processor core 30 known as the ARM9, developed by ARM, Ltd. of Cambridge, England. The processor 28 includes a 32 Kb instruction RAM 32, a 16 Kb data RAM 34, and interface logic 36 for interfacing to an internal data bus 38 referred to as the "T Bus". The processor 28 also contains a 512 byte buffer 40 referred to as a "snoop buffer" or SB, which is described below.

The ASIC 16 also contains PCI interface logic 42 for interfacing to the external PCI bus 12, and media access control (MAC) logic 44 for interfacing to the external PHY logic 24. As shown, the PCI interface logic 42 and MAC logic 44 have connections to the T Bus 38. A memory controller 46 controls the SRAM 20 and the memory bus 22, and also controls access to an on-chip read only memory (ROM) 48. Direct memory access (DMA) and datapath control logic 50 provides connectivity and data movement among the PCI interface logic 42, MAC 44, memory controller 46, and T Bus 38. The DMA and datapath control logic 50 is also connected to the snoop buffer 40 by a separate bus 52. The ASIC 16 also includes interrupt control logic 54, timer logic 56, and $E^2$PROM interface logic 58 connected to the T Bus 38. The $E^2$PROM interface logic provides an interface to the off-chip EEPROM 26.

The T Bus 38 uses separate 32-bit unidirectional buses for data movement to and from connected elements. More specifically, three 32-bit buses carry data from the processor 28 to the PCI interface logic 42, the DMA and datapath control logic 50, and the MAC logic 44 respectively. Also, three 32-bit buses carry data to the processor 28 from respective ones of these logic blocks. The processor 28 is the only "master" on the T Bus 38, meaning that it is the only device that can initiate data transfers. The PCI interface logic 42, the DMA and datapath control logic 50, and the MAC logic 44 all interface to the T Bus 38 as slave devices, as do the interrupt control logic 54, the timer logic 56, and the $E^2$PROM interface logic 58.

The NIC 10 of FIG. 1 operates generally to move packets between the network segment 14 and a host memory that is accessible via the PCI bus 12. All packets either transmitted or received are temporarily buffered in the SRAM 20. The host system communicates with the NIC 10 via data structures referred to as "rings" residing in host memory. Similarly, the processor 28 controls the movement of packets into and out of the SRAM 20 using rings residing in the SRAM 20.

For packets being transmitted, a transmit DMA controller within the DMA and datapath logic 50 is programmed by the processor 28 to obtain a packet and an accompanying packet descriptor from a ring in host memory, and transfer the packet and descriptor to a ring in the SRAM 20. As part of this operation, the DMA controller can load the snoop buffer 40 with data that is being downloaded from the host memory to the SRAM 20. In particular, the DMA controller is programmed to load descriptors into the snoop buffer 40 as they are being transferred from the host into the SRAM 20. This feature enhances performance by enabling the processor to have fast access to descriptors.

Once these items have been transferred to the SRAM 20, the processor 28 examines the descriptor and decides what to do with the packet. Any of a variety of functions may be performed, including for example adding a Virtual Local Area Network (VLAN) tag to the packet, or performing a filtering operation so that only selected packets from the host are sent on the Ethernet segment 14.

For packets to be transmitted to the Ethernet segment 14, the processor 28 builds a new descriptor pointing to the packet data already in the SRAM 20, places the descriptor on a ring in the SRAM 20 used for outgoing packets, and programs a DMA engine within the DMA and datapath logic 50 to transfer the packet to the MAC 44. The MAC 44 transfers the packet data to the PHY circuitry 24, which transmits the packet as a series of bits on the Ethernet segment 14.

For packets received from the Ethernet segment 14, the processing is generally the reverse of that described above. The DMA and datapath logic 50 includes separate receive DMA engines that are responsible for moving packets from the MAC to the SRAM 20, and for moving packets and descriptors between the SRAM 20 and the host memory residing on the PCI bus 12. The processor 28 examines the descriptors of received packets to perform any special processing that may be required and to decide whether the packet is to be passed on to the host. For example, the processor 28 may implement some type of filtering for received packets, so that packets are selectively dropped rather than being forwarded to the host.

Figure 2:
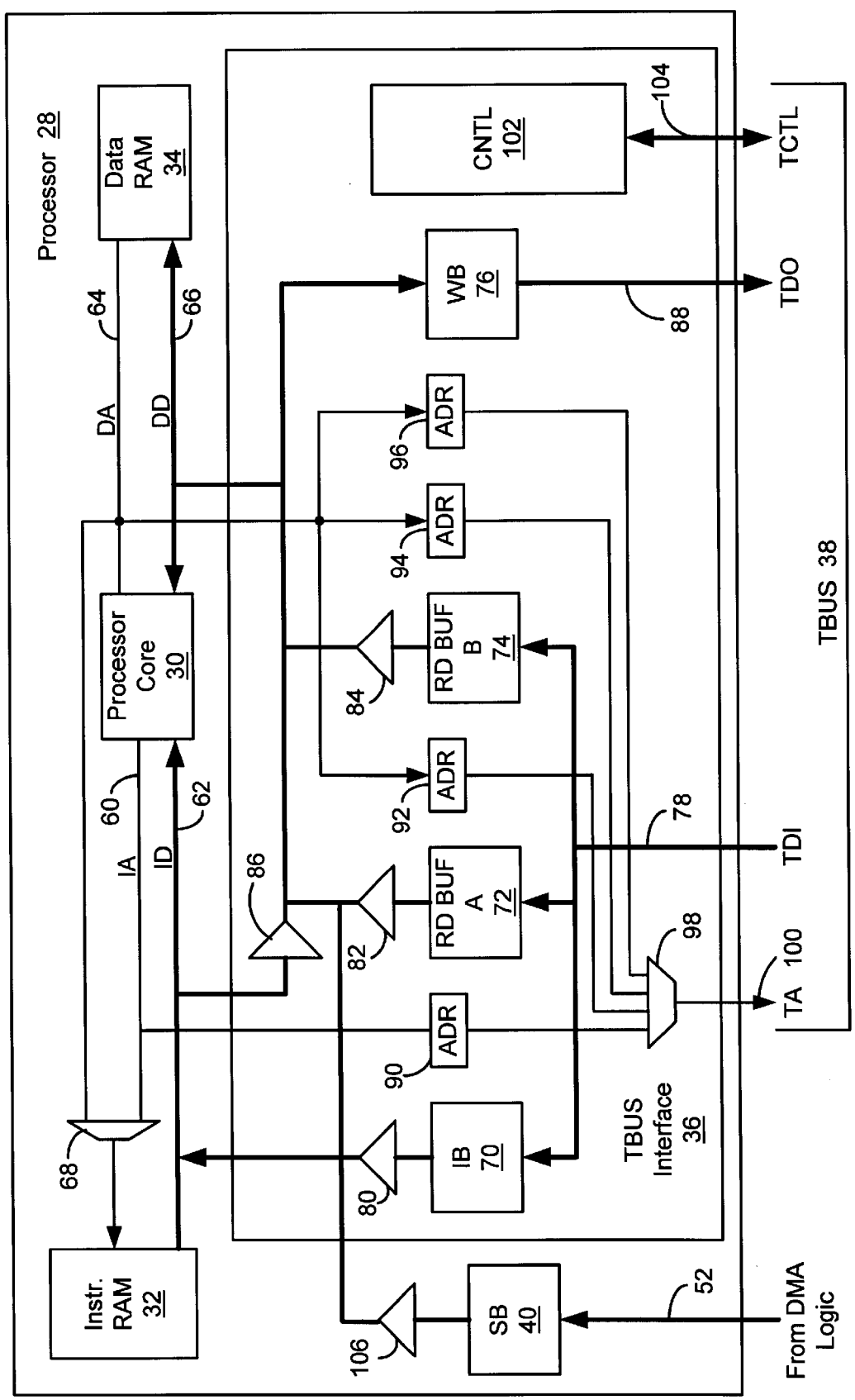
FIG. 2 is a block diagram of the processor, including bus interface logic, in the NIC of FIG. 1.

FIG. 2 shows the processor 28 in more detail. The processor core 30 interfaces with the instruction RAM 32 via an instruction address (IA) bus 60 and an instruction data (ID) bus 62. Also, the processor core 30 interfaces with the data RAM 34 via a data address (DA) bus 64 and a data data (DD) bus 66. The DD bus 66 is connected as a data input to the instruction RAM 32, and a multiplexer 68 is used to select either the IA bus 60 or the DA bus 64 as the source of the address to the instruction RAM 32. This configuration enables the processor core 30 to load operational code into the instruction RAM 32 by performing data store operations into an appropriate address space.

The T Bus interface logic 36 includes an 8-entry instruction prefetch buffer (IB) 70, two 8-word read buffers labeled read buffer A (RD BUF A) 72 and read buffer B (RD BUF B) 74, and a 4-word write buffer (WB) 76. The IB 70 and the read buffers 72 and 74 are loaded from a T Bus Data In (TDI) bus 78. The output of the IB 70 can be selectively driven onto the ID bus 62 via a bus driver 80. The outputs of the read buffers 72 and 74 can be selectively driven onto the DD bus 66 via respective bus drivers 82 and 84. Also, the value on the ID bus 62 can be selectively driven onto the DD bus 66 via a bus driver 86, a function that is used when executing instructions that contain immediate data. The WB 76 is loaded from the DD bus 66, and provides its output to the T Bus 38 on a T Bus Data Out (TDO) Bus 88.

The IB 70, read buffers 72 and 74, and WB 76 have associated address registers 90, 92, 94 and 96 respectively that are used to temporarily store address values when reading or writing data to/from the T Bus 38. As shown, the IB address register 90 is loaded from the IA bus 60, while the remaining three address registers 92, 94 and 96 are loaded from the DA bus 64. The outputs of these address registers are provided as inputs to a multiplexer 98, whose output is provided to the T Bus 38 on a T Bus Address (TA) bus 100. The address register 96 associated with the WB 76 contains multiple storage locations, one for each of the four entries in the WB 76. The address and data from a given store operation advance together through the address register 96 and WB 76 until written to the TBUS 38 as part of a corresponding write transaction.

The T Bus interface logic 36 also contains control logic 102 that controls the movement of data between the T Bus 38 and the various components such as the IB 70, read buffers 72 and 74, WB 76, address registers 90, 92, 94 and 96, and multiplexer 98. This control logic interfaces to the T Bus 38 via various control lines (TCTL) 104. These control lines carry signals such as a clock, a request signal for initiating data transfers, an acknowledge signal for completing transfers, byte enable signals for performing sub-word transfers, and signals indicating whether a transfer is a read or write and whether a single word or a burst of multiple words are involved.

Also shown in FIG. 2 is the snoop buffer 40, which is loaded from the bus 52 from the DMA and datapath logic 50 of FIG. 1. The output of the snoop buffer 40 is selectively driven onto the DD bus 66 via a bus driver 106, so that data from the snoop buffer 40 can be transferred to the data RAM 34 as part of a write transaction.

The T Bus 38 is a synchronous bus capable of byte, half-word, and word read and write operations, as well as 8 word burst read operations. As mentioned above, the T Bus 38 employs a 31-bit address bus TA(30:0) 100, a 32-bit data input bus TDI(31:0) 78, and a 32-bit data output bus TDO(31:0) 88, where "input" and "output" are defined with respect to the processor 28. The DMA & datapath control logic 50 contains splitter circuitry to split the TDO bus 88 into multiple 32-bit output buses that are routed to different logic units on the T Bus, such as the PCI Interface logic 42, memory controller 46, etc. The DMA and datapath control logic 50 also contains merging circuitry to merge multiple 32-bit input buses from these different logic units into the single TDI bus 78 to the processor 28.

The processor 28 is the only entity that may act as the bus "master", i.e., the initiator of data transaction requests. All other T Bus devices, such as the PCI Interface logic 42, DMA & Datapath control logic 50, etc., operate as "slaves", i.e., responders to requests. The signaling between master and slave during data read and write operations on the T Bus 38 is described below.

The following table shows the complete set of T Bus signals. The column "IN/OUT" indicates whether the signal is an input to or output from the processor 28, which is the T Bus master. It will be appreciated that the signals TREQ, TRW, TBE(3:0), TBURST and TACK are included in the set of signals referred to as TCTL 104 in FIG. 2. The input signal TACK results from the multiplexing of separate acknowledge signals emanating from the slave devices; this multiplexing is performed by the merging logic in the DMA and datapath control logic 50 discussed above.

| SIGNAL NAME | IN/OUT (MASTER) | DESCRIPTION |
| --- | --- | --- |
| TBCLK | IN | Clock |
| TREQ | OUT | Initiates transfers |
| TRW | OUT | Distinguishes reads from writes: 1 = Read; 0 = Write |
| TBE (3:0) | OUT | Byte Enable signals |
| TBURST | OUT | Distinguishes burst transfers from single-word transfers |
| TACK | IN | Completes transfers |
| TA (30:0) | OUT | Address |
| TDI (31:0) | IN | Data in |
| TDO (31:0) | OUT | Data OUT |

The use of the various T Bus signals is explained below in the description of T Bus read and write transactions.

The signals TBE(3:0) are used to carry out half-word and byte-length T Bus operations in response to instructions executed by the processor core 30. The processor core 30 generates a 2-bit signal BSize(1:0) indicating whether a word, half-word, or byte operation is being performed. The T Bus interface logic 36 generates the TBE(3:0) signals in response to the value of BSize(1:0), as described below. In addition, the T Bus Interface logic 36 supports both little-endian addressing and big-endian addressing. The following table shows the relationship among the endianness, the BSize(1:0) signals, the lowest two bits of the address generated by the processor, and TBE(3:0):

| BSize (1:0) | Address (1:0) | TBE (3:0) Big-endian | TBE (3:0) Little-endian |
| --- | --- | --- | --- |
| 10 (word) | xx | 1111 | 1111 |
| 01 (½ word) | 0x | 1100 | 0011 |
| 01 (½ word) | 1x | 0011 | 1100 |
| 00 (byte) | 00 | 1000 | 0001 |
| 00 (byte) | 01 | 0100 | 0010 |
| 00 (byte) | 10 | 0010 | 0100 |
| 00 (byte) | 11 | 0001 | 1000 |

'x' = don't care

When a given bit in TBE(3:0) is set to 1, it indicates that a corresponding byte in TDI or TDO is included in the operation. TBE(3) corresponds to the byte formed by data bits (31:24); TBE(2) corresponds to the byte formed by bits (23:16); TBE(1) corresponds to the byte formed by bits (15:8); and TBE(0) corresponds to the byte formed by bits (7:0).

Figure 3:
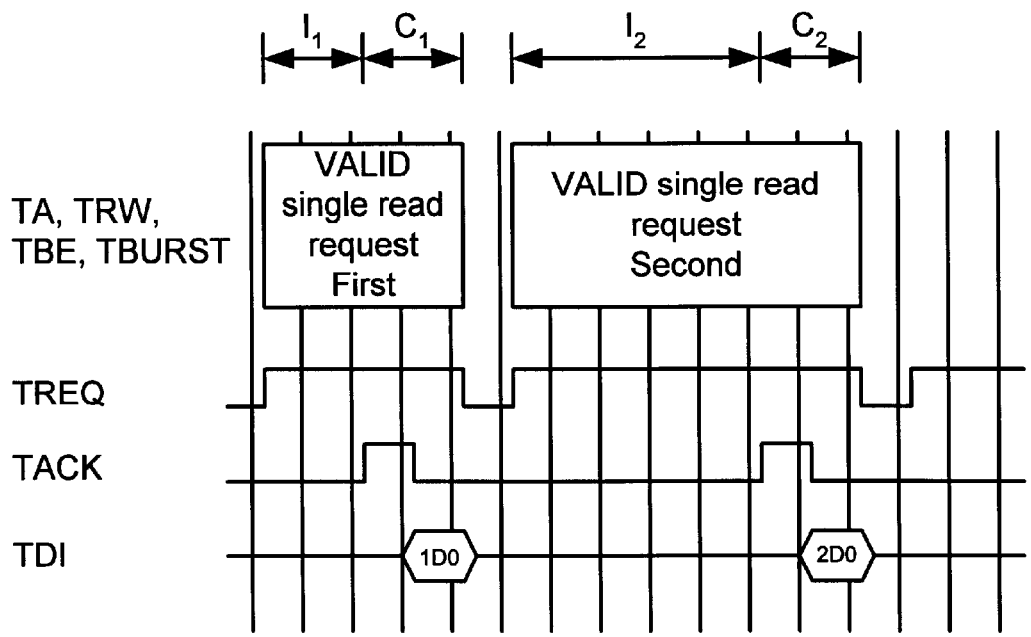
FIGS. 3–5 are timing diagrams showing the operation of the bus of FIG. 1.

FIG. 3 shows a single-word (or smaller) T Bus read transaction followed by a second single-word read transaction. As shown, each transaction includes an initial phase I and a completion phase C. The initial phase I begins upon assertion of the TREQ signal. At this time, the signals TA, TRW, TBE, and TBURST are also asserted by the processor 28 as bus master; these signals remain asserted throughout the transaction as shown. The initial phase I ends, and the completion phase C begins, upon assertion of the TACK signal by the responding slave. For the single-word read as well as other transactions described below, the following timing requirements must be met:

1. TACK may be asserted no earlier than 1 cycle after assertion of TREQ (in FIG. 3 this time is 2 cycles);
2. TACK lasts exactly one cycle;
3. TREQ and the other control signals (including the address TA) must be held until exactly one cycle after deassertion of TACK; and
4. TREQ must be deasserted for at least one cycle between successive transactions.

Additionally, there is predetermined timing between the assertion of TACK and the data. For single-cycle reads, the data is returned in the cycle following the assertion of TACK. The data timing for burst reads and for writes is indicated below.

Figure 4:
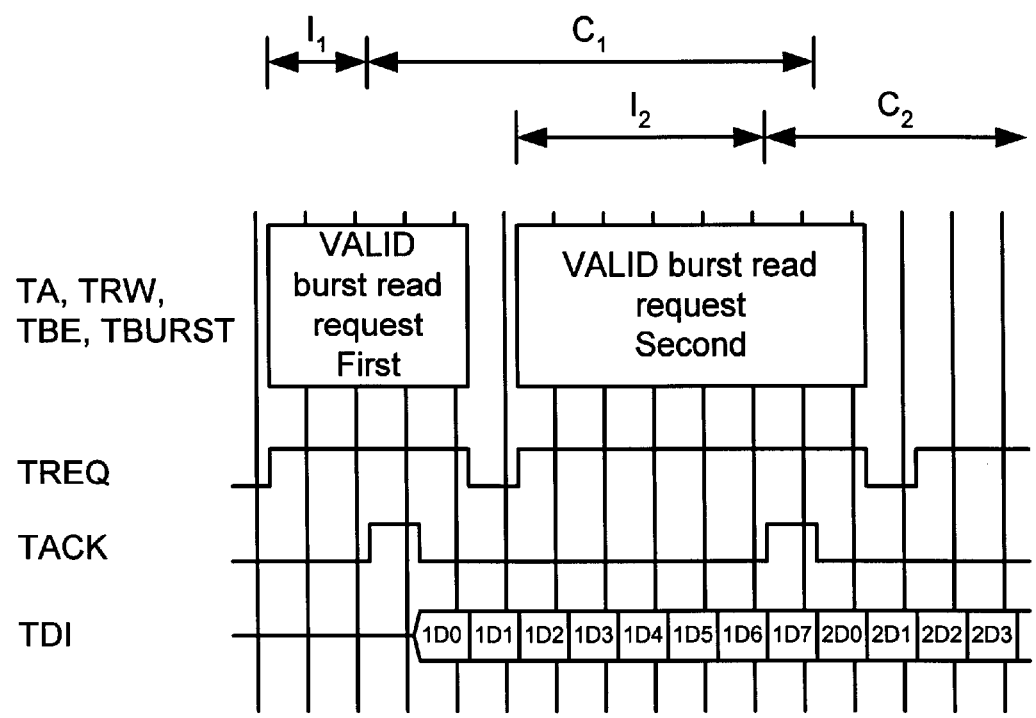

FIG. 4 shows a single-word read followed by a burst read. In this scenario, the first burst read transaction is overlapped with the second transaction in a pipelined fashion, advantageously reducing the access time for the second read and thereby achieving improved performance. As shown in FIG. 4, the first read is not complete until the requested 8 data words have been returned. However, 2 cycles after TACK has been asserted for the first read, the initial phase $I_2$ for the second read transaction begins. The second transaction enters the completion phase $C_2$ one cycle before the end of the completion phase $C_1$ for the first transaction. As shown, for a burst read the first data word is returned in the cycle following the assertion of TACK, and the remaining data words are returned in the seven succeeding cycles.

Figure 5:
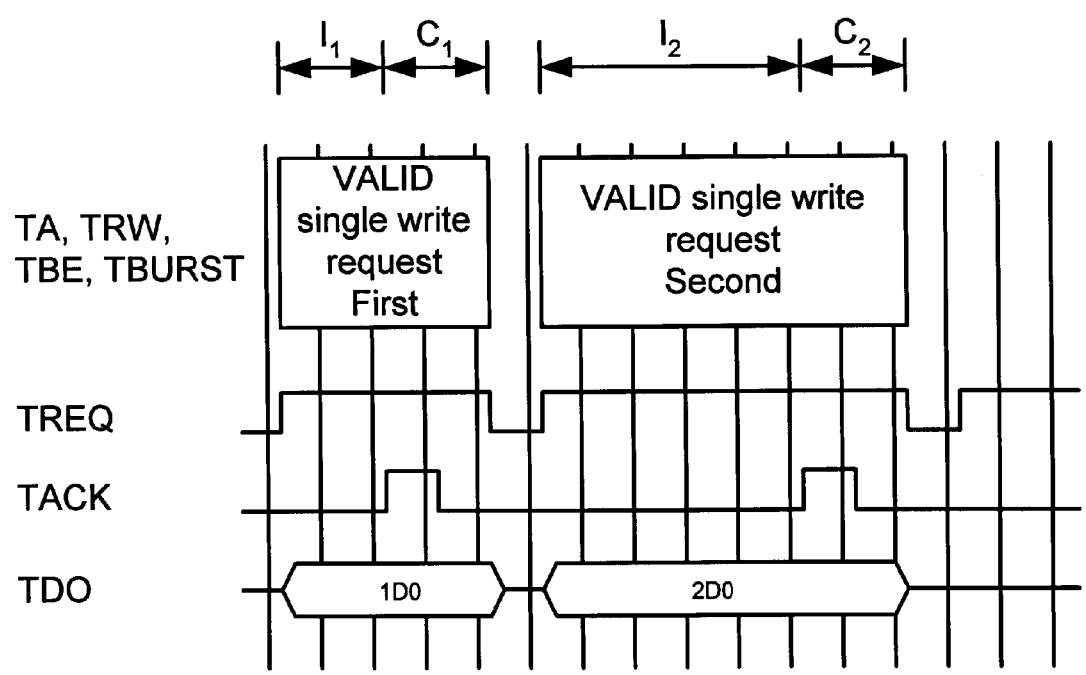

FIG. 5 shows a sequence of two single-cycle writes. The processor 28 as T Bus master asserts the data output bus TDO upon assertion of TREQ, and hold the value on TDO throughout the transaction.

It will be apparent to those skilled in the art that modifications to and variations of the above-described bus communication system are possible without departing from the inventive concepts disclosed herein. Accordingly, the invention should be viewed as limited solely by the scope and spirit of the appended claims.

What is claimed is:

1. Apparatus for communicating between a master device and a slave device, comprising:
   a request line for carrying signals from the master device to the slave device;
   an acknowledge line for carrying acknowledge signals from the slave device to the master device;
   a plurality of unidirectional dedicated address lines for carrying a corresponding plurality of address signals from the master device to the slave device;
   a first plurality of unidirectional dedicated data lines for carrying a corresponding plurality of data signals from said master device to said slave device;
   a second plurality of unidirectional data lines for carrying a corresponding plurality of data signals from said slave device to said master device; and
   a bus controller associated with the master device, the bus controller being operative at selected times to initiate a bus transaction, and in response to the initiation of the bus transaction to:
      transmit a request signal over the request line from the master device to the slave device;
      receive from the slave device over the acknowledge line an acknowledge signal asserted by the slave device;
      transmit an address from the master device to the slave device over the plurality of unidirectional address lines between the assertion of the request signal and a first predetermined time following receipt of the acknowledge signal by the master device;
      if the bus transaction is a write transaction, transmit data from the master device to the slave device over the first plurality of data lines between the assertion of the request signal through at least a second predetermined time following receipt of the acknowledge signal by the master device;
      if the bus transaction is a read transaction, receive data from the slave device over the second plurality of data lines at a third predetermined time following receipt of the acknowledge signal by the master device;
      deassert the request signal no earlier than a fourth predetermined time following receipt of the acknowledge signal by the master device; and
      refrain from initiating a subsequent transaction until at least a fifth predetermined time following the deassertion of the request signal by the master device.

2. The apparatus of claim 1, wherein the bus controller is operative in response to a periodic clock signal, and wherein each of the predetermined times is a corresponding multiple of the period of the clock signal.

3. The apparatus of claim 2, wherein each of the predetermined times is one period of the clock signal.

4. The apparatus of claim 1, wherein:
   the read transaction is a burst transaction during which a burst of successive data words are to be received from the slave device;
   the data received in the read transaction is the first word of the burst of successive data words; and
   the bus controller is further operative, if the bus transaction is a read transaction, to receive the remaining words of the burst over an interval beginning at the third predetermined time following receipt of the acknowledge signal by the master device and ending at a sixth predetermined time following the third predetermined time.

5. The apparatus of claim 4, wherein the bus controller is further operative during the burst read transaction to initiate a second bus transaction prior to the completion of the burst read transaction by asserting the request signal and transmitting another address from the master device to the slave device over the plurality of unidirectional address lines before the sixth predetermined time.

6. The apparatus of claim 1, wherein the first plurality of data lines concurrently carry multiple 8-bit bytes, and further comprising a plurality of byte enable lines for carrying a corresponding plurality of byte enable signals from the master device to the slave device, and wherein the bus controller is further operative, if the bus transaction is a write transaction, to indicate which byte or bytes of the data on the first plurality of data lines are to be written by asserting only corresponding selected ones of the byte enable signals during the write transaction.

7. The apparatus of claim 6, wherein the bus controller is further operative to determine whether the data being transmitted by the master device is arranged in a little-endian fashion or a big-endian fashion, and to select between two possible sets of byte enable values to transmit as the byte enable signals, one set of byte enable values corresponding to the little-endian arrangement and the other set of byte enable values corresponding to the big-endian arrangement.

8. Interface logic for interfacing to a bus, comprising:
   address logic operative to place an address on address lines of the bus;
   data output logic operative to place data on output data lines of the bus;
   data input logic operative to receive data from input data lines of the bus; and
   control logic operative to generate a request signal on a request line of the bus and to respond to an acknowledge signal appearing on an acknowledge line of the bus, and to control the address logic, data output logic, and data input logic such that:
      1) the request signal becomes asserted to indicate the beginning of a transaction;
      2) whenever the request signal is asserted during a transaction, the address placed on the address lines by the address logic is held constant at an address value required for the transaction;
      3) the request signal remains asserted until a predetermined time after the acknowledge signal becomes asserted, at which time the request signal becomes deasserted;
      4) upon becoming deasserted during one transaction, the request signal remains deasserted for at least a minimum predetermined period before becoming asserted for a subsequent transaction;
      5) during a read transaction, data is transferred from the data input lines to the data input logic a predetermined period after the acknowledge signal becomes asserted; and
      6) during a write transaction, the data placed on the data output lines by the data output logic is held constant at a data value required for the transaction beginning upon assertion of the bus request signal and ending a predetermined time after the bus acknowledge signal becomes asserted.

9. A method for communicating between a master device and a slave device, comprising:
   initiating a bus transaction at selected times in a bus controller associated with the master device, and in response to the initiation of the bus transaction:

transmitting a request signal over a request line from the master device to the slave device;

receiving from the slave device over an acknowledge line an acknowledge signal asserted by the slave device;

transmitting an address from the master device to the slave device over a plurality of unidirectional dedicated address lines between the assertion of the request signal and a first predetermined time following receipt of the acknowledge signal by the master device;

if the bus transaction is a write transaction, transmitting data over a first plurality of unidirectional dedicated data lines from the master device to the slave device between the transmission of the request signal through at least a second predetermined time following receipt of the acknowledge signal by the master device;

if the bus transaction is a read transaction, receiving data at the master device over a second plurality of unidirectional data lines from the slave device, the data being received at a third predetermined time following receipt of the acknowledge signal by the master device;

deasserting the request signal no earlier than a fourth predetermined time following receipt of the acknowledge signal by the master device; and refraining from initiating a subsequent transaction until at least a fifth predetermined time after the deassertion of the request signal by the master device.

10. The method of claim 9, wherein each of the predetermined times is a corresponding multiple of the period of a periodic clock signal.

11. The method of claim 10, wherein each of the predetermined times is one period of the clock signal.

12. The method of claim 9, wherein the read transaction is a burst transaction during which a burst of successive data words are to be received from the slave device, and the data received in the read transaction is the first word of the burst of successive data words, and further comprising receiving at the bus controller, if the bus transaction is a read transaction, the remaining words of the burst over an interval beginning at the third predetermined time following receipt of the acknowledge signal by the master device and ending at a sixth predetermined time following the third predetermined time.

13. The method of claim 12, wherein the bus controller is further operative, if the bus transaction is a read transaction, to initiate a second bus transaction prior to the completion of the read transaction, and further comprising transmitting a second request signal and a second address from the master device to the slave device in response to the initiation of the second bus transaction, the second request signal and the second address being transmitted before the sixth predetermined time.

14. The method of claim 9, wherein the first plurality of data lines concurrently carry multiple 8-bit bytes, and further comprising asserting, if the bus transaction is a write transaction, only selected ones of byte enable signals on a plurality of byte enable lines from the master device to the slave device, the byte enable signals being selected to indicate which byte or bytes of the data on the first plurality of data lines are to be written during the write transaction.

15. The method of claim 14, further comprising:

determining, if the bus transaction is a write transaction, whether the data being transmitted by the master device is arranged in a little-endian fashion or a big-endian fashion; and selecting between two possible sets of byte enable values to transmit as the byte enable signals, one set of byte enable values corresponding to the little-endian arrangement and the other set of byte enable values corresponding to the big-endian arrangement.

* * * * *